United States Patent Office 3,712,824
Patented Jan. 23, 1973

3,712,824
EASILY DISPERSIBLE PIGMENT AND PROCESS FOR PRODUCING SAME
Yasumasa Kiyokawa, Yoshihisa Ogawa, and Akira Ono, Osaka, Kazuichi Fukumasu, Nishinomiya, and Hiroyuki Sugisaki, Ashiya, Japan, assignors to Sakata Shokai Co., Ltd.
No Drawing. Filed Nov. 5, 1970, Ser. No. 87,299
Claims priority, application Japan, July 17, 1970, 45/6,262
Int. Cl. C08h 17/02
U.S. Cl. 106—308 M          8 Claims

ABSTRACT OF THE DISCLOSURE

An easily dispersible pigment is produced by admixing a water slurry of a pigment with an oil in water type emulsion which contains a varnish. The varnish comprises (1) an organic liquid which is difficultly water-miscible or water immiscible and which is characterized by a higher boiling point than water, (2) a resin which is compatible with said organic liquid, and (3) an organic solvent which is difficultly water soluble or water insoluble, but which is capable of dissolving or swelling the resin. The emulsion-slurry mixture is agitated whereby the pigment is transferred from the slurry into the oil phase. The mixture of the organic liquid, the resin and the pigment containing a number of foams is obtained and is dried to form an easily dispersible pigment.

BACKGROUND OF THE INVENTION

Field of the invention

This invention relates to a process for producing an easily dispersible pigment, and more particularly to a resin coated and organic liquid coated pigment which is easily dispersible in a wide variety of vehicles including paint, inks and plastics.

Description of the prior art

In the preparation of printing inks, paints and colored plastics, it is essential that the pigments used be very uniformly dispersed in the vehicle to assure uniform coloring without spotting. It is quite difficult, however, to obtain the desired uniform dispersion with most pigments, and consequently, this step has proven to be the most time-consuming in ink, paint or plastic color process. Although a number of suggestions have been advanced as to methods of improving the dispersibility of pigments, heretofore, no completely satisfactory procedure has been found.

It has been suggested that dispersibility can be enhanced by using the pigments in the form of a fine powder. This technique, however, has the disadvantage that powdered pigments are quite bulky and are easily scatterable. Moreover, powdered pigments more easily form a dust which can enter the working environment to create health problems.

Another technique suggested by the prior art has been to add a surface active agent or other dispersing agent to the pigment. This technique, however, likewise has not proven to be completely satisfactory, since it is still difficult to obtain an adequate degree of dispersibility.

SUMMARY OF THE INVENTION

Accordingly, it is one object of this invention to provide an improved process for producing an easily dispersible pigment characterized by a low degree of scatterability and a high degree of dispersibility, which can be used for the preparation of printing inks, paints, colored plastics, and the like.

It is another object of this invention to provide a new and improved process for producing an easily dispersible pigment which can be used for decreasing the blending time, increasing the desired coloring effect, and preventing the formation of non-uniform spotting in the production of printing inks, paints and colored plastics.

These and other objects have now been attained by the process of providing an oil in water type emulsion which contains a varnish comprising an organic liquid which is water immiscible or difficultly water miscible, and which is characterized by a higher boiling point than water, a resin which is compatible with said organic liquid, and an organic solvent which is difficultly water soluble or insoluble in water, but which is capable of dissolving or swelling said resin. The oil in water type emulsion is added to a slurry of a pigment, and the slurry-emulsion mixture is agitated so as to form a foamed mass whereby the pigment is transferred from said slurry into the oil phase of said emulsion. The foamed mass containing the organic liquid, resin and pigment is separated, dried and recovered to obtain the easily dispersible pigment.

DETAILED DESCRIPTION OF PREFERRED EMBODIMENTS

A press cake of a pigment, as obtained from a pigment producing process, is mixed with water and stirred to form a slurry. An oil in water type emulsion having an oil phase containing a varnish is added to the slurry under high speed and severe agitation conditions, so that a soft, fine-celled foam is formed containing the pigment and the resin varnish. Excess water is separated from the foam and the foam is dried to obtain the easily dispersible pigment.

The pigment used for this invention may be either an organic pigment or an inorganic pigment, which may be produced by either a dry method or a wet method. If desired, a press cake of the pigment as obtained from conventional pigment producing processes, can be used. The press cake is mixed with water to make a slurry and the oil in water emulsion is added to the pigment slurry.

In order to provide a suitable slurry, various additives such as surfactants, solvents or the like can be used. The concentration of the solids in the slurry should preferably be less than 20%. The varnish used for the oil in water emulsion may be made of (1) a water immiscible or difficultly miscible organic liquid having either a boiling point of higher than water, or which is generally nonvolatile, (2) a resin which is compatible with said organic liquid, and (3) a water immiscible or difficultly miscible organic solvent, in which the resin is soluble or swellable.

In order to produce the oil in water type emulsion, the varnish is emulsified, if desired with a surfactant, by conventional phase inversion methods, or by the use of a high-speed homogenizer. The smaller the varnish particle size, the more stable will be the emulsion and the more easily dispersible will be the final product. In order to produce the desired foamed mass, the emulsion is mixed with the slurry and agitated with a high speed agitator such as a "Dissolver," which uses high speed rotating blades. Of course, any high speed agitator or homogenizer can be used instead of the "Dissolver" to accomplish the same purpose.

The emulsion slurry mixture is foamed by being agitated just below the liquid surface so as to mix a number of fine air bubbles into the slurry. After allowing the mixture to settle, a soft, fine-celled foam is obtained. The upper phase of the foamed mass is separated and dried in vacuo, or by hot air (50–80° C.), to obtain the easily dispersible pigment.

The advantage of forming the pigment slurry-emulsion combination is to obtain uniform, fine and lossely aggregated particles.

The oil in water type emulsion is added to the pigment slurry while agitating. This causes the pigment in the slurry to be transferred to the varnish phase, to form a mass of foam, pigment emulsion and varnish.

If the fluidity of the slurry is too low, the mixing coefficient of the pigment slurry and the emulsion will also be low so that the foam mass will not be uniform and the ratio of the pigment to the varnish will vary. If the concentration of the pigment in the slurry is too high, the foam mass will be too coarse, dense and hard, because of severe friction of particles included in said foam mass, consisting of varnish, pigment and bubbles, during high speed agitation. As a result, the dispersibility of the final product will be consequently decreased.

The pigment concentration of the slurry is 2–5% for Benzidine Yellow, 3–8% for Lake Red C Carmine 6 B, Phthalocyanine Blue; 5–10% Chrome Yellow and 5–10% Carbon Black. The concentration of the slurry is dependent upon the bulk and dispersibility of the pigment in the water. The concentration of the slurry can be relatively high if the pigment is of low bulk and good dispersibility. On the other hand, the concentration of the slurry should be relatively low if the pigment is characterized by high bulkiness and poor dispersibility.

Suitable organic liquids used in the varnish containing emulsion include petroleum, heavy solvent, mineral oil, the various liquid plasticizers, oil and fat liquid resins and blends thereof. For example, suitable organic liquids include:

Petroleum heavy solvents (higher boiling cuts) such as Carles, Capel, and Leonard Ltd. supply 230°–250° solvent, S.G. 0.814; 260°–290° solvent, S.G. 0.835; 290°–320° C. solvent, S.G. 0.085; and 300°–325° C. solvent, S.G. 0.855; all these solvents are essentially mixtures of aliphatic hydrocarbons, but all have a low aromatic content which improves their solubility properties.

Mineral oils such as colorless thin machine oil having B.R. 265°–345° C. and S.G. about 0.825; Empire Red Oil 1 p. and S.R. 0.910–0.915; spindle oil 0.7–0.9 and S.G. 0.873; medium oil 10 p. and S.G. 0.953; and heavy oil 50 p. and S.G. 0.95–0.97.

Liquid plasticizers such as di-butyl phthalate having chemical formula $C_6H_4(COOC_4H_9)_2$, B.R. 322°–377° C., S.G. 1.050–1.055; tricresyl phosphate. $(CH_3IC_0H_4O)_2PO$ B.R. 430°–440° C., S.G. 1.180–1.186; epoxy modified drying oil; chlorinated diphenyl; chlorinated triphenyl.

Oils and fats such as tung oil, oiticica oil, linseed oil, soya bean oil, sunflower oil, boiled linseed oil, blown linseed oil, linseed stand oil, styrenated oil, maleinized oil, vinyl toluene modified drying oil, urethane oil.

Liquid resins such as drying oil modified alkyds, non-drying oil modified alkyds, polybutene.

The resin used for the varnish can be selected from natural and synthetic resins used for printing inks and paints, such as polymerized rosins, oil soluble phenol resins, oil soluble maleic resins, alkyd resins, petroleum resins, natural mineral resins, cyclized rubber, chlorinated rubber, polyamide, nitrocellulose and polyvinyl chloride. For example, suitable resins include:

Polymerized resin such as hydrogenated resin ester (e.g. Krumbhaar Resin K–302, Lawter Chemicals, Inc.), glycerol ester of resin (e.g. Ester Gum-8L, Hercules, Inc.), pentaerythritol ester of resin (e.g. Pentalyn-A, Hercules, Inc.).

Oil soluble phenol resins such as pure phenolic resin (e.g. Krumbhaar Resin K–1818), resin-modified phenolic resin (e.g. Krumbhaar Resin K–505, Lawter Chemicals, Inc.), natural resin acid-modified phenolic resin (E. G. Albertol IIIL, Albert, Inc.).

Oil soluble maleic resins such as pentaerythritol ester of maleic modified resin (e.g. Pentalyn-G, Pentalyn-X, Hercules, Inc.), fumaric type resin (e.g. Krumbharr Resin K–424, Lawter Chemicals, Inc.).

Alkyd resins such as long oil alkyd resin (e.g. Alftalat 314D. Albert, Inc.), medium-oil length alkyl resin (e.g. Alftalat 399B, Albert, Inc.).

Petroleum resins such as Escorez Resin 1071U, 1102U, Esso, Inc.

Natural mineral resins such as Parco Resin #200, #400, Pan American Resin & Chemical Co., Gilsonite, asphalt.

Cyclized rubber resins such as Cylkosit, Farbenfabriken Bayer AG.

Chlorinated rubber resins such as Parlon 5CP, 10CP, Hercules Powder Co.

Polyamide resins such as Versamid 930, 940, 963, General Mills Co.

Nitrocellulose such as Nitrocellulose HX, DHX.

Polyvinyl chloride such as vinyl chloride vinyl acetate copolymers (e.g. vinyl resin VAGH, VYHN, Union Carbide).

The organic solvent used for the varnish of the emulsion is a water immiscible difficultly miscible solvent. It should be capable of dissolving or swelling the resin. Suitable solvents include benzol, toluol, carbon tetrachloride, ethylacetate, diethyl ether, methyl isobutyl ketone and alike.

The resin varnish is prepared by dissolving the resin in the organic solvent and then mixing with the organic liquid while heating. The ratio of the organic liquid, the resin and the organic solvent will affect the stability of the emulsion and the dispersibility of the final product and is preferably within the range of 1–10:5–15:1–5 parts by weight. A preferred ratio of mineral oil-petroleum resin-toluol, is preferably 10:10:3 parts by weight.

The oil in water type emulsion may be prepared by using various emulsifiers and, if necessary, a surfactant or an auxiliary emulsifying agent. In the emulsification of the varnish, the particle size of the emulsion may be less than $10\mu$ and preferably less than $5\mu$, and should be relatively uniform in size. The particular particle size of the emulsion depends upon the particular mode of agitation and the particular components used.

The oil in water type emulsion should be added to the pigment slowly while subjecting the mixture to severe agitation with a high speed agitator (500–3,000 r.p.m. by "Dissolver") so that the pigment slurry and the emulsion will be uniformly mixed and the pigment particles in the water phase will be transferred to the vehicle phase of the emulsion.

During this operation, it is preferable to place the blades of the agitator just below the surface of the slurry so that the mixture tends to foam as it is agitated. Alternatively, air can be injected into the severely agitated mixture. The combination of the pigment, varnish and air will provide a soft, fine-celled foam having a bulk density of about 0.5–0.9. After settling, excess water will accumulate in the lower phase and can easily be removed by settling, filtration, or centrifugal action without deforming the soft foam mass. The mass is then dried in vacuo at 50–80° C., so as to form a brittle, non-dust like particle of the pigment, the non-volatile liquid and the resin. Since secondary coagulation of pigment produced in accordance with the present invention is presented, said pigment can be redispersed in the form of primary particles, in oily vehicles, such as paints, printing inks, etc.

Accordingly, the pigments of this invention can be easily redispersed into a paint or printing ink vehicle or the like in the condition of primary particles. Moreover, the speed of redispersement is remarkably high since the pigment is in the condition of a porous powder or granule which is coated with the resin and non-volatile liquid. An oily paint or printing ink vehicle can be rapidly permeated into the porous material by kneading or blending in a remarkably short period of time. For example, 25 parts of the easily dispersible pigment of this invention was added to 75 parts of a vehicle for lithographic printing ink. The mixture was agitated by using a conventional "Dissolver" at 1500–2500 r.p.m. for 20 minutes and was milled by passing the mixture through a three-roll mill in one pass in order to obtain a good base ink for lithographic printing. In comparison, using untreated pigment, it is necessary to pass the corresponding mixture through the three-roll mill between three to four times in order to obtain the same result.

An adequate dispersion can be obtained by using the dispersible pigment of the present invention by milling the easily dispersible pigment with a Hoover-Mueller dispersion test (150 lbs.) for 50 turns. A comparable dispersion for untreated pigment requires 300 turns.

The treated pigment of this invention is not dusty and hence cannot contaminate the working environment. Moreover, the treated pigment of this invention has excellent workability, since it is quite wettable in oily vehicles.

Having generally described the invention, a further understanding can be obtained by reference to certain specific examples which are provided herein for purposes of illustration only and are not intended to be limiting in any manner.

EXAMPLE 1

A uniform slurry of pigment was produced by adding 100 parts of a press cake of Benzidine Yellow (pigment content 15%) to 400 parts of water which was stirred with the high speed agitator "Dissolver."

A resin varnish was separately produced by dissolving 2.2 parts of a rosin modified phenol resin in a mixture of 2.3 parts of kerosene and 1.0 parts of toluol while heating. It was then mixed with 22.0 parts of water while stirring with an homogenizer to produce an oil in water type emulsion. The average diameter of the particles of emulsion was about $3\mu$. The emulsion was added to the slurry while stirring with a high speed agitator (1500–2000 r.p.m.) to introduce bubbles of air. Agitation was continued for 30 minutes.

Excess water was separated from the mixture to obtain a mass of a soft foam. The mas was dried, in vacuo, to obtain 19.5 parts of an easily dispersible pigment.

EXAMPLE 2

A uniform slurry of pigment was produced by adding 100 parts of a press-cake of Red Lake C (pigment content 21%) to 320 parts of water. The mixture was stirred with a high speed agitator "Dissolver."

A resin varnish was separately produced by dissolving 3.0 parts of rosin modified maleic resin in a mixture of 3.3 parts of machine oil and 1.5 parts of toluol while heating. The varnish was then mixed with 31.2 parts of water by stirring with an homogenizer to obtain an oil water type emulsion. The average diameter of the particles of emulsion was about $5\mu$.

The emulsion was added to the slurry and the mixture was stirred with a high speed agitator (1500–2000 r.p.m.) to introduce bubbles of air. Agitation was continued for 30 minutes. Excess water was separated from the mixture to obtain a soft foam mass. The mass was dried with hot air at 60–70° C. to obtain 27.3 parts of an easily dispersible pigment.

EXAMPLE 3

A uniform slurry of pigment was produced by adding 100 parts of a press cake of Phthalocyanine Blue (pigment content 22%) to 340 parts of water. The mixture was stirred with the high speed agitator "Dissolver." A resin varnish was separately produced by dissolving 3.3 parts of terpene modified phenol resin in the mixture of 3.3 parts of spindle oil and 1.6 parts of toluol while heating. The varnish was then mixed with 32.8 parts of water and 0.2 part of a cationic surfactant, while stirring with an homogenizer to obtain an oil in water type emulsion. The average diameter of the particles of emulsion was about $5\mu$. The emulsion was added to the slurry and the mixture was stirred with a high speed agitator (1500–2000 r.p.m.) to introduce bubbles of air. Agitation was continued for 30 minutes. Excess water was separated from the mixture to obtain soft foam mass.

The mass was dried with hot air at 60–70° C. to obtain 28.6 parts of an easily dispersible pigment.

EXAMPLE 4

A uniform slurry of pigment was produced by adding 100 parts of a press cake of Chrome Yellow (pigment content 52%) to 430 parts of water. The mixture was stirred with a high speed agitator "Dissolver." A resin varnish was separately produced by dissolving 2.7 parts of a petroleum resin in a mixture of 2.7 parts of machine oil and 0.8 part of toluol while heating. The mixture was then mixed with 30.5 parts of water and 0.2 part of an anionic surfactant, by stirring with an homogenizer to provide an oil in water type emulsion. The average dimeter of the emulsion particles was about 5. The emulsion was added to the slurry while stirring with a high speed agitator (1500–2000 r.p.m.) to introduce bubbles of air. Agitation was continued for about 30 minutes.

Excess water was separated from the mixture to provide a mass of soft foam. The mas was dried by hot air at 60–70° C. to obtain 58.4 parts of an easily dispersible pigment.

Having now fully described the invention, it will be apparent to one of ordinary skill in the art that many changes and modifications can be made thereto without departing from the spirit or scope of the invention. Accordingly, what is claimed as new and desired to be secured by Letters Patent is:

1. A process for producing an easily dispersible pigment which comprises:
    providing an oil in water type emulsion which contains a varnish comprising:
    (1) an organic liquid which is water immiscible or difficultly water miscible and which is characterized by a boiling point of higher than water,
    (2) a resin which is compatible with said organic liquid,
    (3) an organic solvent which is at least difficultly water soluble but which is capable of dissolving or swelling said resin,
    forming a water slurry of a pigment,
    admixing said oil in water type emulsion with said pigment slurry,
    agitating said slurry-emulsion mixture, so as to form a foamed mass whereby the pigment is transferred from said slurry into the oil phase of said emulsion,
    separating said foamed mass which contains said organic liquid, resin and pigment,
    drying said foamed mass and recovering an easily dispersible pigment.

2. Process of claim 1 where the organic liquid is selected from the group consisting of heavy grade petroleum mineral oil, liquid plasticizer, oil, fat liquid resin and blends threeof.

3. The process of claim 1 where a compatible resin is selected from the group consisting of polymerized resin, oil soluble phenol resin, oil soluble maleic resin, alkyd resin, petroleum resin, natural mineral resin, cyclized rubber, chlorinated rubber, polyamide, nitrocellulose and polyvinyl chloride.

4. The process of claim 1 wherein said organic solvent is selected from the group consisting of benzol, toluol, carbon tetrachloride, ethyl acetate, diethyl ether and methyl isobutyl ketone.

5. The process of claim 1 wherein said varnish contains 1–10 parts by weight of said organic liquid to 5–15 parts by weight of said resin to 5 parts by weight of said organic solvent.

6. An easily dispersible pigment which comprises a pigment coated by a combination of an organic liquid which is water immiscible or which is difficultly water miscible, and which is characterized by a boiling point of higher than water, and a resin which is compatible with said organic liquid.

7. The easily dispersible pigment of claim 6 wherein the organic liquid is selected from the group consisting of heavy grade petroleum mineral oil, liquid plasticizer, oil and fat, liquid resin, and blends thereof.

8. The easily dispersible pigment of claim 6 wherein said compatible resin is selected from the group consisting of polymerized resin, oil soluble phenol resin, oil soluble maleic resin, alkyd resin, petroleum resin, natural mineral resin, cyclized rubber, chlorinated rubber, polyamide, nitrocellulose and polyvinyl chloride.

References Cited
UNITED STATES PATENTS

| | | | |
|---|---|---|---|
| 2,722,485 | 11/1955 | Jensen et al. | 106—241 |
| 2,379,070 | 6/1945 | Evans et al. | 260—29 |
| 1,431,080 | 10/1922 | Acheson | 106—262 |
| 2,205,985 | 6/1940 | Lapointe | 134—79 |
| 3,615,812 | 10/1971 | Clarl et al. | 106—308 M |

JAMES E. POER, Primary Examiner

J. V. HOWARD, Assistant Examiner

U.S. Cl. X.R.

106—308 Q, 309